United States Patent Office 3,741,782
Patented June 26, 1973

3,741,782
STABILIZED ZIRCONIUM SALTS
Donald T. Stewart, Buckinghamshire, and Ian McAlpine, Failsworth, England, assignors to The British Aluminum Company Limited, London, England
No Drawing. Filed May 13, 1971, Ser. No. 143,263
Claims priority, application Great Britain, May 13, 1970, 23,177/70
Int. Cl. C08b 21/00
U.S. Cl. 106—162                                         11 Claims

ABSTRACT OF THE DISCLOSURE

This invention relates to the stabilising of zirconium salts such as are used to convert aqueous solutions of natural or synthetic polymers capable of forming hydrophilic colloids into insoluble films. More particularly, the invention is concerned with the stabilising of a solution of an alkali metal zirconyl carbonate with a compound containing a diol group and of the general formula $R_1$—CHOH—CHOH—$R_2$. The invention extends to solutions so stabilised and to the use of the stabilised solutions in the manufacture of paper, paper board and the like cellulosic web materials.

BACKGROUND OF THE INVENTION

It is known that zirconium salts such as the tetrachloride, oxychloride, acetate and ammonium zirconyl carbonate (AZC) are able to convert aqueous solutions of polymers capable of forming hydrophilic colloids, whether naturally occurring polymers such as starch and casein or synthetic polymers such as polyacrylic acid, polyvinyl acetate, polyvinyl alcohol or cellulose derivatives, into insoluble films. These films exhibit excellent adhesive qualities and water resistance and find applications in many technologies particularly those technologies concerned with the manufacture and use of paper and paper board.

Although those salts of zirconium which give aqueous solutions of pH less than 7, e.g. the oxychloride and acetate, are highly effective as insolubilising agents the practical application of their insolubilising property is often limited by their corrosive nature, the uncontrolled speed of their gelling action and by the fact that many practical sytems, e.g. most of those in paper coating technology operate at a pH greater than 7. An illustration of their application is provided by the use of zirconium acetate solution as a wash liquid which is applied to a coating of starch on paper in order to render the starch coating insoluble.

However, the major practical applicaiton of the insolubilising property of zirconium salts resides in the use of alkali metal, and especially ammonium, zirconyl carbonate solutions which are stable in the pH range 7.5–11.0 and which may be added to the aqueous vehicle containing the polymer. Interaction between the polymer and alkali metal zirconyl carbonate whilst still present in solution occurs only slowly and in a controlled manner but deposition of the mixture on to a suitable substrate followed by drying at an elevated temperature causes decomposition of the alkali metal zirconyl carbonate and the hydrated zirconia generated is able to react with the polymer and cause it to become insoluble. Nevertheless, alkali metal zirconyl carbonate solution present some difficulties in use largely owing to their instability at elevated temperatures and on storage for long periods. At temperatures above 40° C. alkali metal zirconyl carbonate solutions commence to deposit hydrated zirconium oxide which appears as a gel and which can cause the previously mobile solutions to solidify completely.

This instability of alkali metal zirconyl carbonate solutions inhibits their use in, for example, paper coating systems operating at temperatures higher than 40° C., and in wash coating systems which either desirably or adventitiously operate above 40° C.

It is an object of the present invention to provide a solution of an alkali metal zirconyl carbonate having an improved stability on standing and at temperatures somewhat in excess of 40° C.

SUMMARY OF THE INVENTION

According to one aspect of the present invention a method of stabilising a solution of an alkali metal zirconyl carbonate comprises incorporating in the solution as a stabilising agent a compound containing a diol group and of the general formula $R_1$—CHOH—CHOH—$R_2$ where $R_1$ and $R_2$ are the same and represent a COOH group or a salt thereof or $R_1$ represents a COOH group or a salt thereof and $R_2$ represents a group containing at least two carbon atoms and two OH groups, or, $R_1$ and $R_2$ each represent a group containing at least two carbon atoms and at least one OH group.

According to another aspect of the invention a stabilised solution of an alkali metal zirconyl carbonate contains as a stabilising agent a compound containing a diol group and of the general formula

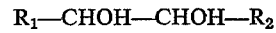
$R_1$—CHOH—CHOH—$R_2$ where:

$R_1$ and $R_2$ are the same and represent a COOH group or a salt thereof, or $R_1$ represents a COOH group or a salt thereof and $R_2$ represents a group containing at least two carbon atoms and two OH groups, or $R_1$ and $R_2$ each represent a group containing at least two carbon atoms and at least one OH group.

Preferably the stabilising agent is present in a quantity sufficient to stabilise the solution for at least 24 hours at a temperature of 70° C.

The hydroxy carboxylic acids, or the salts thereof, which may be used as a stabilising agent include tartaric, dihydroxy tartaric, glucuronic, saccharic, mucic and gluconic acids.

The hydroxy compounds which may be used as a stabilising agent include mannitol, fructose, glucose and other sugars.

It is to be understood that in the present context the expression "alkali metal" is to include besides sodium and potassium the ammonium ion.

According to a further aspect of the invention a method of coating paper, paper board and like cellulosic web materials comprises applying to the material to be coated an aqueous solution or dispersion of a natural or synthetic polymer capable of forming a hydrophilic colloid and a solution of an alkali metal zirconyl carbonate stabilised in accordance with the method of the invention and applying heat to cause the polymer to form a water insoluble film.

The polymer solution and the stabilised alkali metal zirconyl carbonate solution may be mixed together before being applied to the material or the polymer solution may be applied to the material first and the stabilised zirconyl carbonate solution subsequently applied.

The invention also extends to a paper, paper board or like cellulosic material when coated by the method of either one of the two immediately preceding paragraphs.

DESCRIPTION OF THE PREFERRED EMBODIMENTS

So that the invention may be clearly understood examples of how the various aspects of the invention may be carried into effect are now given.

Ammonium zirconyl carbonate solution containing 10% by weight of zirconia, $ZrO_2$, is produced as an article of commerce by treating solid zirconium basic sulphate with sodium carbonate solution to form solid zirconium basic carbonate and then dissolving 1 mole of this basic carbonate in an aqueous solution containing 3 moles of ammonium carbonate.

The addition of 3% by weight of stabilising agent based on the weight of zirconia in the ammonia zirconyl carbonate solution produces a degree of stabilisation but an addition of 5 to 15% by weight of stabilising agent is preferred since this has been found to keep the carbonate solution stable for at least 24 hours at temperatures up to 80° C.

Example I

An ammonium zirconyl carbonate solution was prepared by stirring 500 g. of zirconium basic carbonate into a solution of 180 g. of ammonia and 260 g. of ammonium bicarbonate. The resulting solution was filtered and diluted with water until its zirconia content was 10%. 0.5 g. of ammonium tartrate, as stabilising agent, was added to 50 g. of the diluted carbonate solution and the stabilised solution was heated in a water bath maintained at 70° C. After 48 hours in the water bath the stabilised solution was found to be clear and not gelled.

50 g. of the ammonium zirconyl carbonate solution containing no stabilising agent when heated in a water bath at 70° C. gelled within two hours.

The following Table I shows the results obtained with other stabilising agents incorporated in an ammonium zirconyl carbonate solution prepared as just described and and containing 10% by weight of zirconia. With each stabilising agent used the resulting stabilised solution was heated in a water bath maintained at 70° C.

TABLE I

| Stabilising agent | Percent by weight of agent based on $ZrO_2$ content | | | |
|---|---|---|---|---|
| | 1 | 2 | 5 | 10 |
| Diamm. tartrate | Unstable | Borderline | Stable | Stable. |
| Amm. gluconate | do | do | do | Do. |
| Dihydroxytartaric acid | | | | Do. |
| Mannitol | | | | Do. |
| Amm. mucate | | | | Do. |
| Fructose | | | | Do. |

With 1% of mannitol and fructose the carbonate solution was found to be stable for about 24 hours but with the other stabilising agents in the table the carbonate solution remained stable for at least 48 hours.

It will be appreciated that in the production of ammonium zirconyl carbonate from zirconium basic sulphate that after the zirconyl basic carbonate has been formed it may be treated with ammonia and ammonium bicarbonate in various proportions e.g. $ZrO_2$: ammonium bicarbonate: ammonia mole ratios of 1:2:0.25; 1:3:0.5 and higher, and that ammonium bicarbonate and ammonia can be replaced by ammonium carbonate in various proportions e.g. $ZrO_2$: ammonium carbonate mole ratios of 1:2, 1:3 and higher, to form the desired product.

Example II

Another well known method of producing an ammonium zirconyl carbonate solution comprises adding 1 mole of zirconium oxychloride solution to a solution containing 3 moles of ammonium carbonate. The resulting carbonate solution is empirically identical with the ammonium zirconyl carbonate solution prepared by the method previously described except that it contains additional ammonium chloride resulting from the decomposition of the zirconium oxychloride.

It has been found that an ammonium zirconyl carbonate solution containing 10% by weight of zirconia when prepared from zirconyl oxychloride requires 0.4% by weight of a stabilising agent, based on the zirconia content, to achieve the same degree of stability as is obtained by the addition of 3% of stabilising agent to an empirically identical ammonium zirconyl carbonate solution prepared from zirconium basic sulphate. Correspondingly, 1% of stabilising agent is required to give to a zirconyl oxychloride prepared carbonate solution stability for 24 hours at temperatures up to 80° C. It is thought that the significant difference in amounts of stabilising agent necessary to effect the same degree of stabilisation of ammonium zirconyl carbonate solutions when prepared by the two methods is related to the differing degree of polymerisation of the zirconium complex ion present, the stabilising agent linking with the polymerisable group of the complex and effectively preventing further polymerisation.

Table II shows the results obtained with stabilising agents incorporated in an ammonium zirconyl carbonate solution prepared from zirconyl oxychloride and containing 10% by weight of zirconia. With each stabilising agent used the resulting stabilised solution was heated for 48 hours in a water bath maintained at 85° C.

TABLE II

| Stabilising agent | Percent by weight of agent based on $ZrO_2$ content | | | |
|---|---|---|---|---|
| | 0.1 | 0.22 | 0.40 | 1 |
| Potassium sodium tartrate. | Unstable | Borderline | Almost stable. | Stable. |
| Sodium gluconate | do | do | do | Do. |

With only 0.4% of stabilising agent, the solution was found to go slightly translucent during the test but no gelling or precipitate was formed.

It will be appreciated that in the preparation of ammonium zirconyl carbonate from zirconium oxychloride the mole ratio of oxychloride to ammonium carbonate can be 1:4 or higher, and that ammonium carbonate can be replaced by ammonium bicarbonate in similar mole ratios e.g. 1:3; 1:4 and higher, to form the desired product.

Example III

Sodium zirconyl carbonate was prepared by adding concentrated zirconium oxychloride solution to hot saturated sodium carbonate solution as described by L. A. Pospelova and L. M. Zaitsev, Russ. J. Inorg. Chem. II (8), 995, (1966). As shown in Table III the solutions prepared were stabilised by addition of disodium tartrate. The solutions containing stabilising agent were maintained at a temperature of 80° C. for at least 24 hours.

TABLE III

| Stabilising agent | Percent by weight of agent based on $ZrO_2$ content | | | | |
|---|---|---|---|---|---|
| | 10 | 20 | 26 | 34 | 40 |
| Disodium tartrate | Unstable | Unstable | Almost stable. | Stable | Stable |

Example IV

Sodium zirconyl carbonate solutions were prepared by heatic at 40° C. zirconium basic carbonate and sodium carbonate at mole ratios of $ZrO_2$: sodium carbonate of 1:2 and 1:3. These solutions, which contain 10% $ZrO_2$, were stabilised with sodium tartrate as shown in Table IV. The solutions containing stabilising agent were maintained at a temperature of 85° C. for at least 24 hours.

TABLE IV

| Stabilising agent | Percent by weight agent based on $ZrO_2$ content | | |
|---|---|---|---|
| | 10 | 15 | 20 |
| Disodium tartrate | Unstable | Unstable | Partial gel. |

Example V

Potassium zirconyl carbonate was prepared by adding saturated zirconium oxychloride solution dropwise and with vigorous stirring, into a 15% solution of potassium carbonate. A 1:1 mixture of methanol and water was added to precipitate the white solid product which was washed with methanol (ref. L. A. Pospelova and L.M. Zaitsev, Russ. J. Inorg. Chem. II (8), 995, (1966)). The product was dissolved in water to give a 10% $ZrO_2$ solution which was stabilised with sodium tartrate as shown in Table V. The solutions containing stabilising agent were maintained at a temperature of 80° C. for at least 24 hours.

TABLE V

| Stabilising agent | Percent by weight agent based on $ZrO_2$ content | |
|---|---|---|
| | 10 | 30 |
| Disodium tartrate | Unstable | Stable |

Example VI

Potassium zirconyl carbonate can also be prepared by heating at 40° C. zirconium basic carbonate solution with potassium carbonate solution, or with potassium bicarbonate solution and potassium hydroxide solution in various mole ratios, e.g. $ZrO_2$: potassium carbonate 1:1, 1:2, 1:3; $ZrO_2$: potassium bicarbonate: potassium hydroxide 1:2:1.

A solution of potassium zirconyl carbonate was prepared from zirconium basic carbonate and potassium carbonate and 10% by weight of disodium tartrate based on the $ZrO_2$ content of the solution was added. The solution containing the stabilising agent was found to be stable after being maintained at a temperature of 85° C. for at least 24 hours.

The stabilised alkali metal zirconyl carbonate solutions according to the invention find application in the insolubilisation of polymers capable of forming hydrophilic colloidal solutions particularly when the polymer solutions are to be used at temperatures which would render ineffective, if not destroy, unstabilised insolubilising agents.

For example paper coating slips containing starch and a stabilised insolubilising agent according to the invention may be used at higher temperatures than has previously been possible in order to lower the viscosity of the slips and to permit the inclusion of more starch in the slip. With the stabilised solution of the invention starch solutions used as adhesives may be applied hot so that the cured film is water resistant and starch or casein coatings may be applied to paper or paper board and treated with a hot stabilised solution of the invention as a wash to convert the starch or casein coating into an insoluble film.

To illustrate the applications of stabilised solutions of alkali zirconyl carbonates according to the invention the following examples are given.

Example VII 300 g. of china clay were dispersed, using a Z blade mixer, in 100 g. of water containing 0.9 g. of a polyphosphate dispersing agent, 0.3 g. of methylene dinaphthalene sulphonic acid (sodium salt) and 0.3 g. of sodium hydroxide. This gave a coating slip containing 75% solids. 30 g. of an oxidised potato starch was added to 100 g. of water and heated for 45 mins. at 80° C. After cooling, the starch was mixed thoroughly into the 75% solids coating slip followed by 60 g. of a styrene-butadiene latex. Finally 9 g. of the stabilised ammonium zirconyl carbonate prepared as described in Example I and containing 0.5 g. of ammonium tartrate was added with stirring to give a 60% solids mix. The coating slip was applied to one side of a well-formed paper base stock by pulling a puddle of the slip over the paper with a wire wrapped rod and the coated paper dried at 80° C. for 3 minutes. The wet-rub resistance of the dried coated paper was determined by fixing it to the circumference of a wheel and rotating the wheel a given number of revolutions with the paper in contact with a wet felt pad. The coating removed by the pad was determined by a turbidimetric method. The amount of pigment picked up in 10 revolutions of the wheel was 5 mg.

A repeat experiment using an unstabilised ammonium zirconyl carbonate gave a wet-rub of 4 mg. and one without any ammonium zirconyl carbonate at all gave a wet-rub of 16 mg.

The results show the ability of ammonium zirconyl carbonate to insolubilise starch coatings is not affected by stabilisation according to the method according to the invention.

Example VIII 142.5 g. of china clay and 7.5 g. titanium dioxide were dispersed in 150 g. of water containing 0.45 g. of a polyphosphate dispersing agent and 0.15 g. of a sodium polyacrylic dispersing agent to give a 50% solids mix. 9 g. of casein was wetted with 27 g. of water and heated to 50° C. 0.9 g. of sodium hydroxide dissolved in 6 g. of water was added to the casein mix, the temperature raised to 60° C. and held there for 20 minutes. The casein was then added with agitation to the 50% solids clay/titanium dioxide mix followed by 36 g. of latex and 0.9 g. polyvinyl alcohol. The resulting 47% solids coating slip was applied to a well-formed paper stock using a wire wrapped rod and dried at room temperature.

A solution of ammonium zirconyl carbonate containing 2% $ZrO_2$ was produced by diluting the 10% $ZrO_2$ solution prepared as described in Example I. To 100 g. of this solution was added 0.4 g. ammonium gluconate as stabilising agent and the stabilised solution placed in a water bath at 70° C. The solution did not gel after 48 hours.

A wash coat of the hot stabilised solution was then applied to the dry slip-coated paper by drawing the solution over the coating with a wire wrapped rod. The resulting coating was dried at 80° C. for 3 minutes.

Wet-rub determinations by the method described in Example VI produced a pickup of 1 mg.

The application described in Example VII is particulyarly suitable in connection with the production of foldable boxboard for use in the manufacture of such items as food cartons. Since such boxboard is generally not going to be subjected to printing by an offset lithographic process no insolubilising agent need be admixed with the coating slip. However, it is desirable to impart to the coating a substantial degree of water resistance to provide better handling properties. The required degree of water resistance can be achieved by applying a wash coating of an insolubilising material to the slip coated box board as just described. As in practice the location of the dispensing equipment for the insolubilising material will reach a temperature of about 60° C., most conventional insolubilising materials will begin to gel as they are unstable at temperatures much above 40° C.

Another application of stabilised solutions of alkali metal zirconyl carbonates is in the manufacture of corrugated board. Here the adhesive generally used for joining the fluted part to the liners is a starch derivative and is usually applied hot to facilitate rapid drying along the line of contact. If a waterproof bond is required a special adhesive is required. Not only is this adhesive more expensive than a normal starch derived adhesive but a manufacturing run is made more costly because the adhesive holding tank and associated pipework must be washed on changing from one adhesive to the other as the waterproof adhesive is incompatible with the normal starch derived adhesive.

A starch derived adhesive containing a conventional insolubilising agent cannot be used to provide a waterproof adhesive as the temperature of application is so high that premature setting of the adhesive would occur. A starch derived adhesive containing an alkali zirconyl carbonate stabilised in accordance with the present invention would, however, be usable at the application temperatures and would provide a waterproof bond. In addition to being less expensive to produce than the special waterproof adhesive normally used manufacturing costs would be reduced because any residue of the adhesive from a "waterproof" run could be mixed in the holding tank with the next batch of starch derived adhesive to be used whether of the waterproof kind or not.

We claim:

1. A method of stabilising a solution of zirconyl carbonate selected from sodium, potassium and ammonium zirconyl carbonate comprising incorporating in the solution as a stabilising agent a compound containing a diol group and of the general formula

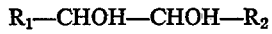

where $R_1$ and $R_2$ are selected from the group consisting and $R_1$ and $R_2$ each representing a COOH group or a salt thereof; $R_1$ representing a COOH group or a salt thereof and $R_2$ representing a group containing at least two carbon atoms and two OH groups; and $R_1$ and $R_2$ each representing a group containing two carbon atoms and at least one OH group wherein said solution is heat stabilized to a temperature in the range of at least 40° C. to about 85° C.

2. A method according to claim 1, in which the stabilising agent is a hydroxy carboxylic acid or a salt thereof.

3. A method according to claim 1, in which the stabilising agent is a hydroxy compound.

4. A method according to claim 3, in which the hydroxy compound is selected from the group consisting of mannitol and fructose 5. A stabilised solution of zirconyl carbonate selected from sodium, potassium and ammonium zirconyl carbonate containing, as a stabilising agent, a compound containing a diol group and of the general formula

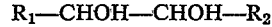

where $R_1$ and $R_2$ are selected from the group consisting of $R_1$ and $R_2$ each representing a COOH group or a salt thereof; $R_1$ representing a COOH group or a salt thereof and $R_2$ representing a group containing at least two carbon atoms and two OH groups; and $R_1$ and $R_2$ each representing a group containing two carbon atoms and at least one OH group.

6. A stabilised solution according to claim 5 in which the stabilising agent is a hydroxy carboxylic acid or a salt thereof.

7. A stabilised solution according to claim 5 in which the stabilising agent is a hydroxy compound.

8. A stabilised solution according to claim 7, in which the hydroxy compound is selected from the group consisting of mannitol, fructose and glucose.

9. A stabilised solution according to claim 5, in which the stabilising agent is present in a quantity sufficient to stabilise the solution for at least 24 hours at a temperature of 70° C.

10. A method of stabilising a solution of a zirconyl carbonate selected from sodium, potassium and ammonium zirconyl carbonates comprising incorporating in the solution as a stabilising agent a compound selected from tartaric, dihydroxytartaric, saccharic, mucic and gluconic acids wherein said solution is heat stabilized to a temperature in the range of at least 40° C. to about 85° C.

11. A stabilised solution of a zirconyl carbonate selected from sodium, potassium and ammonium zirconyl carbonates containing, as a stabilising agent, a compound selected from tartaric, dihydroxytartaric, saccharic, mucic and gluconic acids.

References Cited

UNITED STATES PATENTS

| | | | |
|---|---|---|---|
| 3,332,794 | 7/1967 | Hart | 106—162 X |
| 2,995,414 | 8/1961 | Paul | 106—208 |
| 2,822,281 | 2/1958 | Masley | 106—208 |
| 2,780,555 | 2/1957 | Budewitz | 106—208 |

THEODORE MORRIS, Primary Examiner

U.S. Cl. X.R.

106—146, 213, 287 R; 117—152; 260—29.6 M, 29.6 BM